United States Patent [19]

Welter

[11] 4,262,726
[45] Apr. 21, 1981

[54] RADIAL TIRE WITH A LOW ANGLE CARCASS OVERLAY PLY

[75] Inventor: Thomas N. H. Welter, Keispelt, Luxembourg

[73] Assignee: The Goodyear Tire & Rubber Company, Akron, Ohio

[21] Appl. No.: 130,541

[22] Filed: Mar. 14, 1980

Related U.S. Application Data

[63] Continuation of Ser. No. 916,270, Jun. 16, 1978, abandoned.

[51] Int. Cl.³ ................... B60C 19/18; B29H 17/14
[52] U.S. Cl. ........................... 152/361 R; 156/128 N; 156/133; 152/354 R; 152/360
[58] Field of Search ............... 152/354 R, 357 R, 360, 152/361 R; 156/123 R, 128 R, 128 N, 133

[56] References Cited

U.S. PATENT DOCUMENTS

| | | | |
|---|---|---|---|
| 2,884,044 | 4/1959 | Hulswit et al. | 156/123 |
| 3,095,027 | 6/1963 | Weber | 156/128 N |
| 3,245,454 | 4/1966 | Lewis | 152/354 |
| 3,455,100 | 7/1969 | Sidles et al. | 156/128 N |
| 3,516,465 | 6/1970 | Guyot | 152/361 R |
| 3,756,883 | 9/1973 | Gay | 156/128 N |
| 3,850,219 | 11/1974 | Snyder | 152/361 DM |
| 3,916,969 | 11/1975 | Auerbach | 152/354 |
| 3,918,506 | 11/1975 | Marzocchi | 152/361 R |

Primary Examiner—John E. Kittle
Attorney, Agent, or Firm—Frederick K. Lacher; Frank Pincelli

[57] ABSTRACT

A radial tire having a belt structure consisting of a pair of belt plies reinforced with parallel cords. A single ply is disposed between the carcass plies of the tire and the belt structure. This single ply or carcass overlay is reinforced with parallel cords which extend circumferentially of the tire. Further, the reinforcement cords of the carcass overlay are inextensible when the tire is molded and vulcanized, but elongatable in correlated relation to the blow-up ratio of the tire from a cylindrical to a toroidal shape.

13 Claims, 3 Drawing Figures

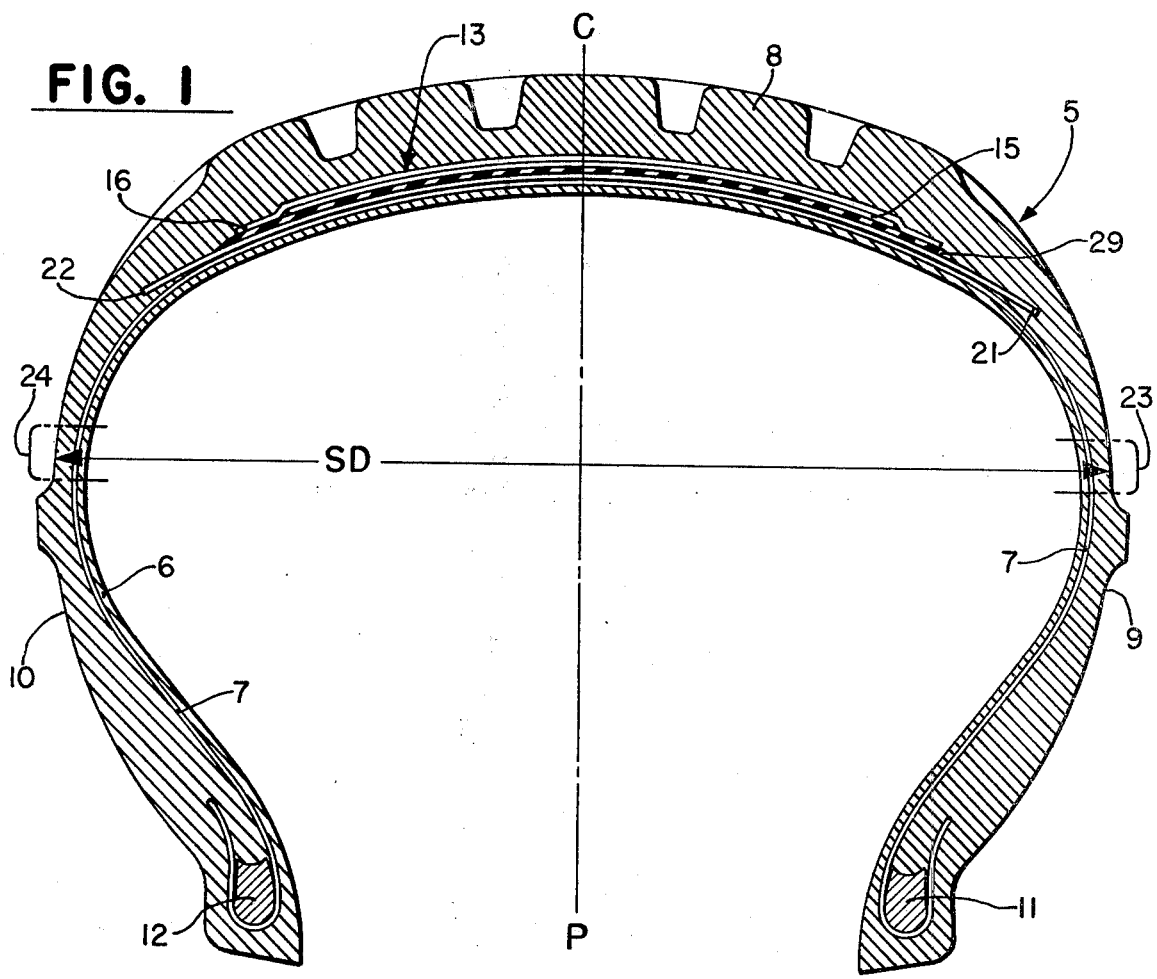
FIG. 1
FIG. 2
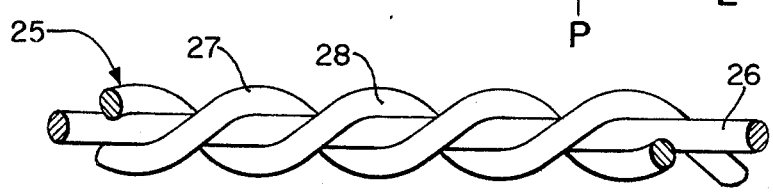
FIG. 3

RADIAL TIRE WITH A LOW ANGLE CARCASS OVERLAY PLY

This is a continuation of application Ser. No. 916,270 filed June 16, 1978; now abandoned.

BACKGROUND OF THE INVENTION

The invention is particularly well suited for a high-speed radial tire having a belt structure which consists of a pair of belt plies that are reinforced with cords made of a high modulus material, for example, brass-coated steel wires, and is designed to improve the handling and speed performance characteristics of such a tire, by avoiding deformation of the tread which generally occurs at higher speeds, and to reduce the ply steer effect, i.e. the lateral forces on the tire at zero degree slip angle. The invention is also advantageously used in tires with several or a number of belt plies which are reinforced with glass or aramid cords.

Briefly stated, the invention is in a radial tire having a belt structure comprising a pair of belt plies reinforced by cords. A carcass overlay is provided between the belt structure and carcass plies of the tire. The carcass overlay consists of a single ply with opposing marginal edges which extend laterally beyond the belt structure. The carcass overlay is reinforced with cords which extend substantially circumferentially of the tire. Further, the cords of the carcass overlay are inextensible when the tire is toroidally shaped and vulcanized, but elongatable in correlated relation to the blow-up ratio of the tire from a generally cylindrical configuration to a toroidal shape.

The expression "blow-up ratio", as used herein and in the claims, means the ratio of the overall diameters of the carcass plies, when the tire is fully molded and vulcanized in a toroidal configuration, and when the carcass plies are in a cylindrical shape on a tire building drum.

DESCRIPTION OF THE DRAWING

The following description of the invention will be better understood by having reference to the annexed drawing, wherein:

FIG. 1 is a cross section of a radial tire made in accordance with the invention;

FIG. 2 is a plan view of the tire with the tread removed to show the cord angle relationship between the reinforcement cords of the carcass plies, belt structure, and carcass overlay; and FIG. 3 is a perspective view of a reinforcement cord of the carcass overlay.

DETAILED DESCRIPTION OF THE INVENTION

With reference to FIG. 1 of the drawing, there is shown a tire 5 which essentially comprises: a fluid impervious innerliner 6; at least one carcass ply 7 surrounding the innerliner 6; a tread 8 and pair of sidewalls 9, 10 surrounding the carcass ply 7 and terminating at a pair of annular, inextensible beads 11, 12 and a belt structure 13 interposed between the carcass ply 7 and tread 8.

The carcass ply 7 (FIG. 2) is reinforced with parallel cords 14 which are radially oriented, i.e. disposed at angles A in the range of from 75 to 90 degrees measured in relation to a plane CP containing the mid-circumferential centerline of the tread 8, such plane hereinafter referred to as the centerplane. The reinforcement cords 14 of the carcass ply 7 is composed of any suitable material, e.g. rayon, polyester, glass fibers, aramid, or metal.

The belt structure 13 (FIG. 2) comprises two belt plies 15, 16 which are in superimposed relation and reinforced, respectively, with parallel cords 17, 18 that are disposed at angles B,D greater than 15 degrees and preferably in the range of from 15 to 30 degrees measured from the centerplane. The reinforcement cords 17, 18 of the two belt plies 15,16 extend in different directions from the centerplane, although the cord angles of the reinforcement cords 17, 18 are generally the same and in this embodiment are both around 20 degrees. The reinforcement cords 17, 18 of the belt structure 13 are inextensible and composed of any suitable material such as aramid, glass, or metal, e.g. preferably brass-coated steel wire.

A belt underlay, or carcass overlay 20 is interposed between the belt structure 13 and carcass ply 7. The carcass overlay 20 is adjacent to the carcass ply 7 and has lateral margin edges 21, 22 which extend beyond the belt structure 13 into the sidewalls 9, 10 of the tire 5, but terminate short of the maximum flex zones, or areas 23, 24 of the sidewalls 9, 10. The maximum flex zones 23, 24 are normally at the thinnest section of the sidewalls 9,10 of the tire 5, such sections usually being at about the maximum width or section diameter SD of the tire 5. The carcass overlay 20 (FIG. 2) consists of a single ply which is reinforced with parallel cords 25 that extend substantially circumferentially of the tire 5, i.e. at cord angles E in the range of from 0 to 13 degrees relative to the centerplane. The carcass overlay 20 has no effect on ply steer, i.e. the tendency of the tire construction to move the tire in a lateral direction, when the reinforcement cords 25 thereof are at very low angles of about zero degrees. The carcass overlay 20 has a decided effect upon the reduction of ply steer when the reinforcement cords 25 are disposed at angles of 4 degrees or more, and preferably around 8 degrees which seems to be the optimum cord angle for eliminating ply steer without seriously affecting the restrictive effect of the low angle reinforcement cords 25. Thus, the preferred cord angles of the reinforcement cords 25 are in the more selective range of from 4 to 13 degrees relative to the centerplane. The reinforcement cords 25 of the carcass overlay 20 extend in the same general direction from the centerplane as do the reinforcement cords 17 of the nearest belt ply 15.

The tire 5 is built by flat building a band of the carcass 7 and the carcass overlay 20 by wrapping the carcass ply 7 and the overlay 20 successively around a cylindrical tire building drum. This band, when removed from the drum has a cylindrical shape wherein the reinforcement cords 25 of the carcass overlay 20 are elongatable in corresponding relation to the blow-up ratio of the tire. This band is then shaped to a toroidal configuration for receipt of the belt structure 13, whereafter the tire 5 is molded and vulcanized. The reinforcement cords 25 of the carcass overlay 20 are substantially inextensible, when the band is fully shaped in the toroidal configuration and when the tire 5 is completely molded and vulcanized.

An appropriate cord 25 for the reinforcement of the carcass overlay 20, is described in copending U.S. patent application Ser. No. 916,271, which is assigned to the assignee of this application was concurrently filed with this application. The copending application covers a highly elongatable reinforcement cord 25 (FIG. 3)

having a core 26 with a spiral wrapping of a pair of inextensible yarns 27,28 which are of opposite lay and which are composed of any suitable material such as rayon, nylon, polyester, aramid, or metal. The core 26 is of a material having a relatively low tensile, which loses tensile strength when subjected to elevated temperatures, such as a polymer selected from the group consisting of polyolefines including polyethylene and polypropylene.

Another typical reinforcement cord 25 is one comprised of 4 yarns which are wound continuously at 5.5 turns per centimeter around a 0.5 millimeter diameter cotton core of 2.5 kilograms tensile at break, each of the yarns being composed of filaments of nylon twisted together at a rate of 5 turns per centimeter to form a yarn of 840 denier, the overall cord diameter being 1.2 millimeters. Another example of a reinforcement cord 25 is one having a 0.5 millimeter cotton core with a spiral wrapping of 2×1500 aramid yarns at 6 turns per centimeter, the overall cord diameter being 1.2 millimeters.

A cushion 29, composed of a separate layer of soft, highly resilient, rubber material is, preferably, positioned between the carcass overlay 20 and nearest belt ply 15 to uncouple the belt structure 13 and permit unhampered reorientation of the cords of these two components during the molding and vulcanization of the tire 5. The cushion 29 should be at least as wide as the belt structure 13 and have a thinner gauge than the contiguous layers of rubber material, i.e. the carcass overlay 20, and nearest belt ply 15. The rubber material of the cushion 29 should have an elasticity, defined at 100 percent elongation, which is at least 100 grams per square millimeter less than that of the rubber material of the carcass overlay 20 and nearest belt ply 15.

It has been found from the typical stress-strain plots of the cords that a large variety of passenger tire sizes with blow-up ratios in the range from 155-195 percent can be made by using a core and at least one yarn spirally wrapped therearound according to the invention; if the characteristic elongation of the cord is chosen to be in the range of 70-90 percent. This is, therefore, a preferred range of elongatability for this particular type of tire with the aforementioned blow-up ratio. It will be obvious that without leaving the scope of this invention, other such preferred ranges can be easily found by one skilled in the art for other tire sizes with other blow-up ratios.

Thus, there has been described a radial tire having a two-ply belt structure in combination with a special carcass overlay for achieving highly improved high-speed characteristics. Further, a resilient cushion of rubber can be provided between the carcass overlay and belt structure to provide an uncoupling action between these two components and to facilitate reorientation of the cords during the molding and vulcanization of the tire. Any of the aforementioned cord angles are in relation to a fully molded and vulcanized tire which is uninflated.

What is claimed is:

1. A tire comprising:
   (a) at least one carcass ply reinforced with cords which are radially oriented between beads of the tire;
   (b) a tread and pair of sidewalls surrounding the carcass ply and terminating at a pair of annular, inextensible beads;
   (c) a belt structure interposed between the tread and carcass ply for annularly reinforcing the tire, the belt structure comprising a pair of belt plies in superimposed relation, each of the belt plies being reinforced by parallel cords disposed at angles greater than 15 degrees relative to a plane containing the midcircumferential centerline of the tread, the reinforcement cords of the plies being substantially inextensible in all conditions of the tire and extending in different directions from said plane;
   (d) a carcass overlay disposed between the carcass ply and belt structure, the carcass overlay consisting of a single ply with opposing marginal edges which extend laterally beyond the belt structure, the carcass overlay being reinforced with continuous parallel cords which are disposed at angles in the range of from 0 to 13 degrees relative to said plane; and
   (e) said tire being manufactured by applying said beads and wrapping said carcass ply and said carcass overlay on a generally cylindrical tire building drum, removing said tire from said cylindrical tire building drum, shaping said tire to a toroidal configuration and elongating said reinforcement cords, applying said belt structure and said tread over said carcass overlay and thereafter molding and vulcanizing said tire, said reinforcement cords of said carcass overlay being substantially inextensible after the tire is toroidally shaped, and being elongatable in corresponding relation to the blow-up ratio of the tire when the carcass and attached overlay and cylindrically shaped prior to toroidal expansion and application of said belt structure and said tread.

2. The tire of claim 1, wherein the cords of said carcass overlay each have a high modulus, low tensile strength core, and at least one inextensible yarn spirally wrapped around the core, when the overlay is laid in the unshaped tire.

3. The tire of claim 1, wherein the cords of the carcass overlay and nearest belt ply extend in the same general direction from said plane.

4. The tire of claim 2, wherein the core of said cords loses tensile strength when subjected to elevated temperatures.

5. The tire of claim 1, wherein the cords of said carcass overlay with the tire of the toroidal configuration are disposed at angles in the range of from 4 to 13 degrees relative to said plane.

6. The tire of claim 5, wherein the cords of said carcass overlay are disposed at angles of around 8 degrees.

7. The tire of claim 1, wherein marginal edges of the carcass overlay extend into the sidewalls and terminate short of the maximum flex zones of the sidewalls.

8. The tire of claim 1, which includes:
   (f) a cushion disposed between the belt structure and carcass overlay, the cushion being composed of a separate layer of elastomeric material having an elasticity which is at least 100 gr/mm$^2$ less than that of elastomeric material of which the cracass overlay and the belt ply adjacent said cushion are composed, the elasticity being defined at 100 percent elongation of said material.

9. The tire of claim 2, wherein the core is composed of cotton and the spiral wrapping is composed of material of the group of rayon, nylon, polyester, aramid and metal.

10. The tire of claim 1, wherein the cords of the carcass ply are composed of materials of the group of rayon, polyester, glass fibers, aramid, and steel.

11. The tire of claim 1, wherein the cords of said pair of belt plies are composed of materials of the group of metal, aramid and glass.

12. The tire of claim 11, wherein the cords of said pair of belt plies are composed of brass-coated steel wires.

13. The tire of claim 2, wherein the tire has a blow-up ratio in the range from 155–195 percent and the cords of said carcass overlay are elongatable of from 70–90 percent when the overlay is in a cylindrical configuration.

* * * * *